United States Patent
Purtell

[11] 3,844,308
[45] Oct. 29, 1974

[54] DIRIGIBLE IRRIGATION SYSTEM
[75] Inventor: Rufus J. Purtell, Brownfield, Tex.
[73] Assignee: Tri-Matic, Inc., Brownfield, Tex.
[22] Filed: June 12, 1973
[21] Appl. No.: 369,226

Related U.S. Application Data
[63] Continuation of Ser. No. 846,211, July 30, 1969, abandoned.

[52] U.S. Cl. .............................................. 137/344
[51] Int. Cl. ....................... A01g 25/02, B05b 3/12
[58] Field of Search ............ 137/344; 239/212, 213, 239/177, 178

[56] References Cited
UNITED STATES PATENTS

| | | | |
|---|---|---|---|
| 2,711,615 | 5/1955 | Boice, Jr. | 137/344 UX |
| 3,095,939 | 7/1963 | Hine | 239/178 |
| 3,245,595 | 4/1966 | Purtell | 137/344 X |
| 3,394,729 | 7/1968 | Bower et al. | 239/212 X |
| 3,410,489 | 11/1968 | Waldrum | 239/212 X |
| 3,459,373 | 8/1969 | Koers | 239/178 X |
| 3,465,766 | 9/1969 | Siebert | 137/344 X |
| 3,498,314 | 3/1970 | Gheen | 137/344 |
| 3,498,542 | 3/1970 | Hefner et al. | 137/344 X |
| 3,500,856 | 3/1970 | Boone et al. | 239/177 X |
| 3,515,350 | 6/1970 | Kruse et al. | 137/344 X |

Primary Examiner—Henry T. Klinksiek
Attorney, Agent, or Firm—Wendell Coffee

[57] ABSTRACT

An agricultural irrigation system using a tranversely movable pipe is guided by regulating the speeds of the vehicles at each end of the pipe. All of the other vehicles are aligned to form a straight line between the two end vehicles. Therefore, the entire system is guided by speeding up or slowing down the end vehicles.

9 Claims, 6 Drawing Figures

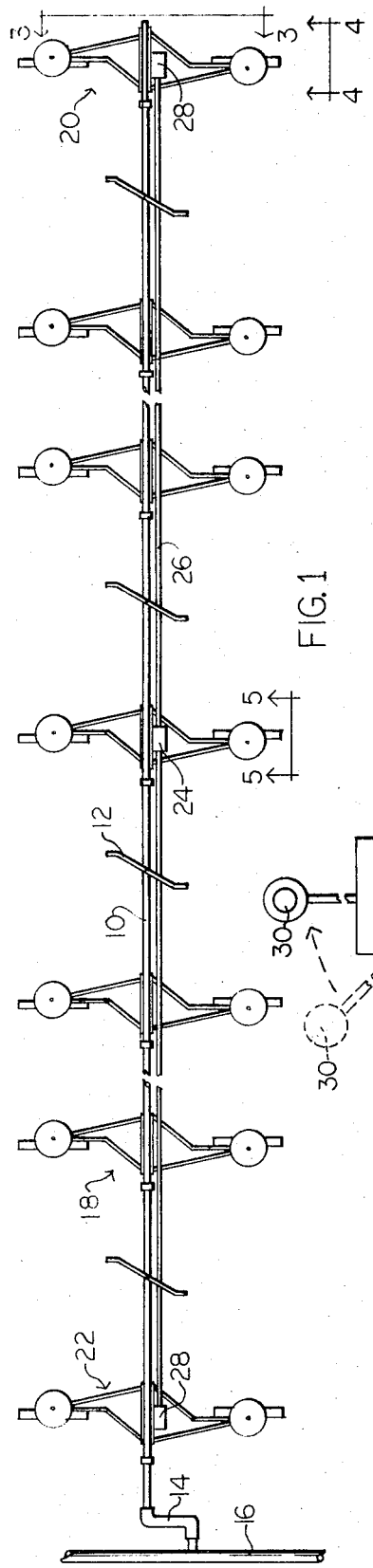
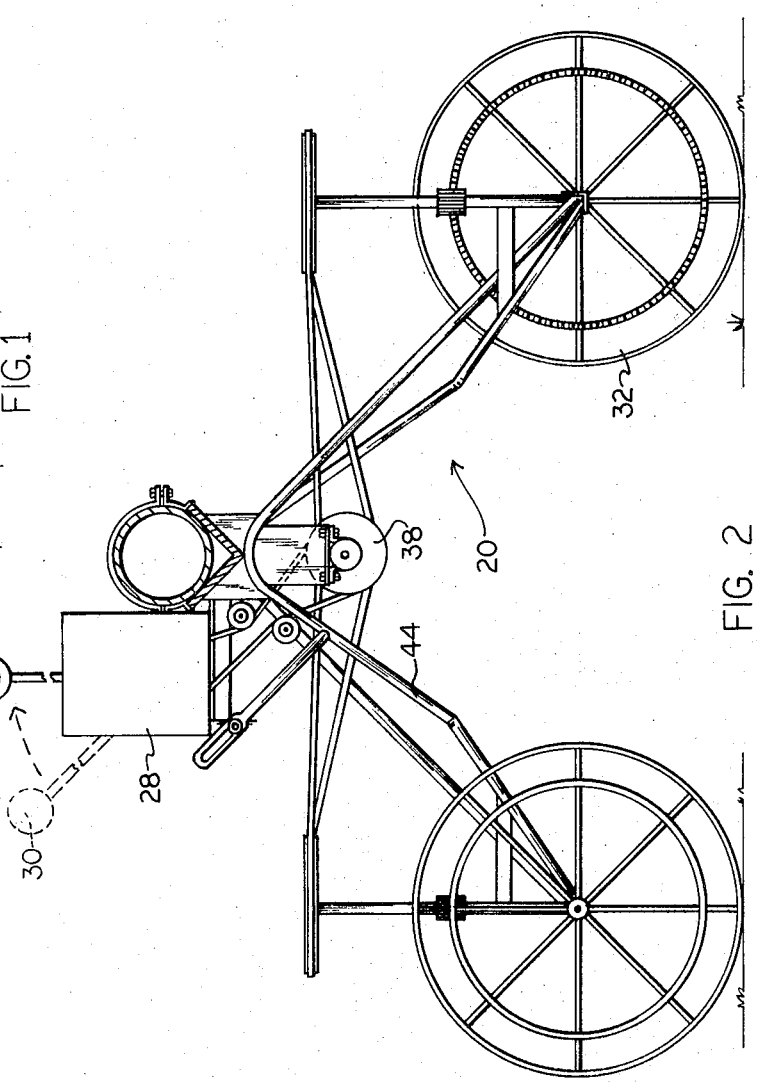

INVENTOR:
RUFUS J. PURTELL

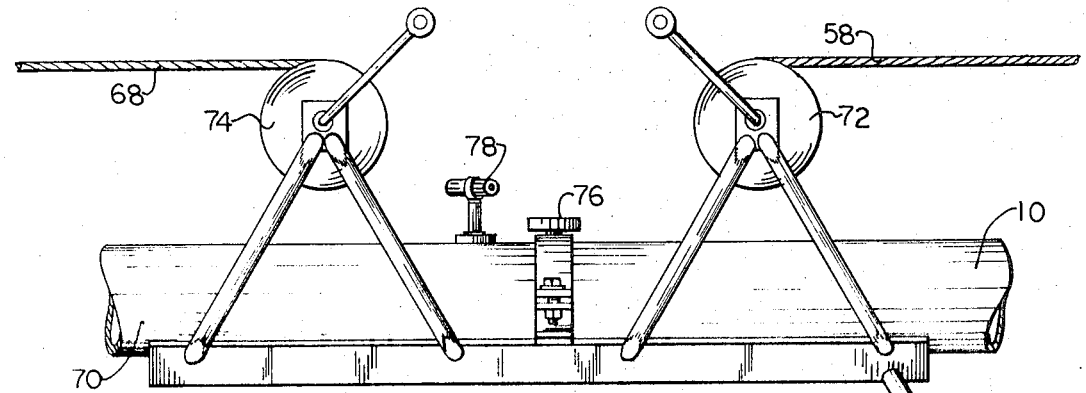
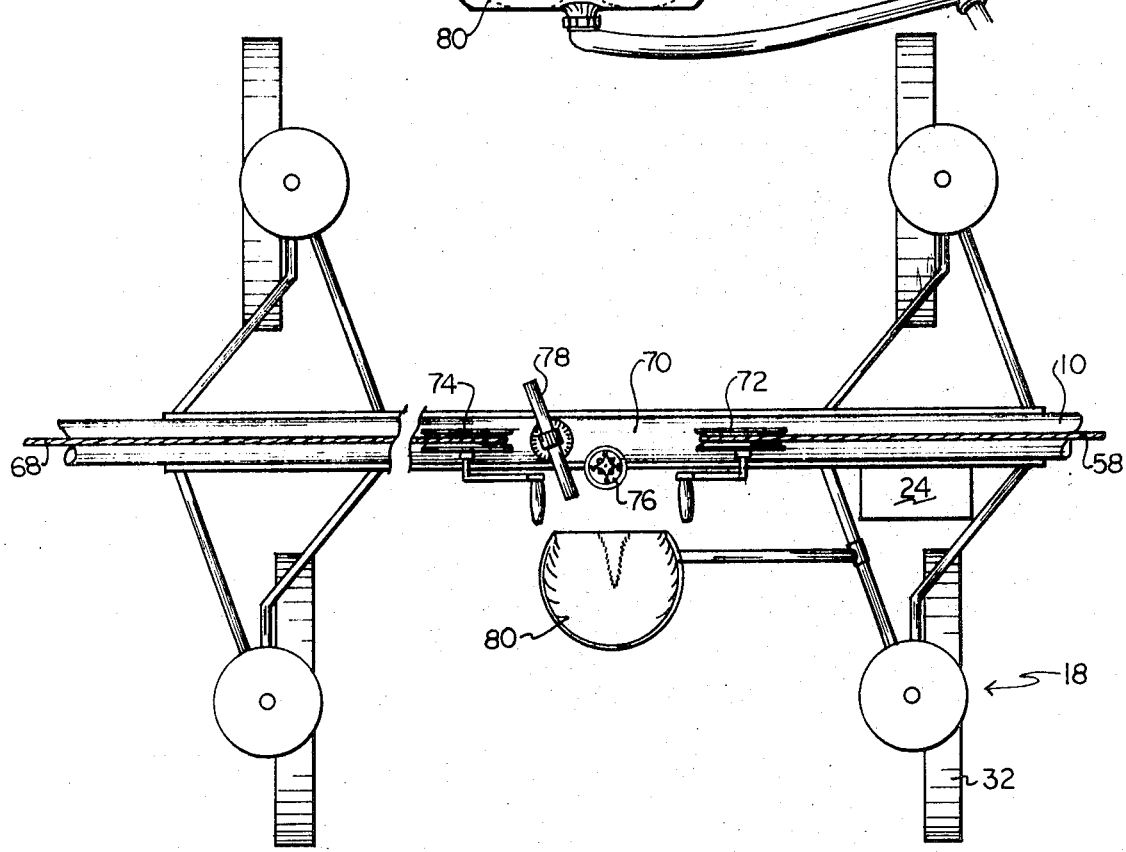
FIG. 6

DIRIGIBLE IRRIGATION SYSTEM

This is a continuation of application Ser. No. 846,211, filed July 30, 1969, now abandoned.

CROSS-REFERENCE TO RELATED APPLICATIONS

The disclosure of this application is related to my joint application with RALPH D. Boone, "Driving Chalk Line," filed Aug. 23, 1967, Ser. No. 662,802 now Pat. No. 3,500,856, although no priority is claimed at this time.

BACKGROUND OF THE INVENTION

1. Field of the Invention

This invention relates to agricultural irrigation and more particularly to sprinkling water upon agricultural fields from sprinklers mounted upon a pipe which moves transversely of the pipe; the invention could also be characterized as being a system of vehicles for moving a pipe across a field to be irrigated.

2. Description of the Prior Art

In recent years, the art of irrigation by sprinkling water on the land has developed to a sophisticated stage. Particularly, it is known that sprinklers may be mounted upon a pipe mounted upon vehicles for movement. The movement of the pipe can either be longitudinally of the pipe or, as in the case of my invention, transverse of the pipe. There have been many suggestions for the motive powering of the pipe. e.g., the pipe might be pulled forward with cables as disclosed in my prior U.S. Pat. No. 3,009,646. (All numbers hereinafter refer to U.S. patents). However, this invention relates to systems where each of the vehicles is driven. Also, this invention would relate to vehicles which are wheel driven, e.g., my prior U.S. Pat. No. 3,245,595, or skid-driven as shown in BOONE U.S. Pat. No. 3,268,174. The system may be guided in one sense by guiding each of the vehicles so that the system does not move at right angles to the pipe, but as an angle thereto (right oblique or left oblique) as disclosed in my prior U.S. Pat. No. 3,230,969.

In the situations where each of the vehicles is driven, a problem arises in aligning the vehicles so that the pipe is straight. Many various systems for aligning the different vehicles have been shown in the prior art. Although the following discussion of these systems is extensive, it is by no means exhaustive.

ZYBACH U.S. Pat. No. 2,604,359 shows a system where one end of the pipe is anchored and the pipe moves in a circle, although the vehicles move transverse to the pipe. In this particular system, the vehicles are driven by hydraulic motors which receive their source of hydraulic power from the irrigation pipe itself and the alignment is by cables which are attached to the pipe on either side of the vehicle.

MAGGART U.S. Pat. No. 2,628,963 shows a system where each of the vehicles is driven by an electric motor and the flexing in a pipe joint detects misalignment.

BEHLEN U.S. Pat. No. 2,726,985 discloses a system where each of the vehicles is driven by a hydraulic motor and the alignment is by the bend in the pipe.

DICK et al. U.S. Pat. No. 2,800,364 discloses a system wherein the vehicles are driven by hydraulic motor and the misalignment is detected by the bend of the pipe, however, the information that the pipe is misaligned is transmitted by electrical signal from the means for detecting disalignment to the hydraulic motor.

CLAYTON U.S. Pat. No. 2,807,500 discloses a hydraulic drive with the alignment information being transmitted by hydraulic pressures.

My prior U.S. Pat. No. 3,245,595 has each of the vehicles driven by mechanical means, namely, a shaft with the bend of the pipe being used to detect misalignment.

BOONE U.S. Pat. No. 3,268,174, discloses a mechanical drive means for each of the vehicles, the drive being reciprocating cables wherein the pipe is free to move upon the vehicle and misalignment detected by movement of the pipe on the vehicle.

HOGG U.S. Pat. No. 3,281,080 discloses a shaft drive with a cable system attached to the pipe for detecting misalignment.

BOONE U.S. Pat. No. 3,302,656 discloses a cable-powered vehicle with a separate "chalk-line" cable attached only to the two end vehicles with the alignment of all other vehicles to this single "chalk-line" cable.

CURTIS, et al. U.S. Pat. No. 3,314,608 discloses a circle move, i.e., one end of the pipe is anchored and the other end rotates around it, with the drive of each vehicle being by hydraulic or electrical power and the misalignment to be corrected determined by the pipe moving on the vehicle.

My prior U.S. Pat. No. 3,417,766 discloses a system having a shaft drive wherein the relationship between the shaft and the pipe itself furnishes the misalignment information.

My joint application with BOONE, noted above, discloses a system where the vehicles are powered by reciprocating cable. The misalignment information is determined from this same cable which is used to power each of the vehicles.

SUMMARY OF THE INVENTION

My invention goes a next step beyond the prior art. Where the prior art discloses means for aligning all the vehicles so that a straight line is formed from the two end vehicles (or in the case of a circle move, a straight line from the end vehicle to the pipe pivot), the invention disclosed in this application guides the system itself. I have found that in watering large tracts such as are found in the western area of our country, it is desirable to be able to guide the entire system as it traverses the field to be watered. I have found that the whole system can be guided by regulating the speed of each end vehicle. Therefore, if one end vehicle moves faster than the other, the system as a whole will change direction of travel, thus being guided.

This invention could be applied to any of the drive systems and alignment systems of the prior art. I.e., those systems having a hydraulic drive, the speed of the end vehicle could be regulated by throttling the hydraulic fluid flowing to the motors of each of the end vehicles. Those systems of the prior art using an electric motor on each of the vehicles, the speed of the end vehicle could be regulated by controlling the electrical power being supplied to the motor of the end vehicle. Those systems using cable power to power the vehicles, the end vehicle could be regulated in the same way as each of the vehicles themselves are regulated. I.e,. if the speed of each vehicle is regulated by blanking out teeth of a ratchet wheel, the speed of the end vehicle could be regulated by blanking out teeth of the ratchet wheel. If the intermediate vehicles are regulated by regulating the length of stroke which is transmitted to each vehicle, the end vehicle could be regulated in this same manner.

The preferred embodiment of this invention powers each of the vehicles by rotating a drive shaft which extends the length of the system. The gear ratio and thus the speed of each of the vehicles is regulated by changing effective diameter of V-belt sheaves.

Therefore, the preferred embodiment is described as operating on such a system, however, being aware of the different drive systems and alignment systems of the prior art, I consider it within the skill of the ordinary artisan to adapt this invention to any of the other systems known in the prior art, whether they have been specifically enumerated above or not.

In certain situations such as wheat fields, it is desirable to have sighting apparatus on the system. This can take the form of a sighting tube to be aligned with a distant object; or, this can take the form of a compass. Therefore, the preferred embodiment includes both a compass and a sighting apparatus so that the operator has available both and may choose which ever best suits his needs.

An object of this invention is to irrigate agricultural fields.

Another object of this invention is to provide an irrigation system having a movable pipe with sprinklers thereon. The system as a whole may be guided while the entire system is maintained in alignment.

Further objects are to achieve the above with a structure that is sturdy, compact, durable, lightweight, simple, safe, versatile, reliable, and efficient, yet inexpensive and easy to manufacture, install, adjust, operate, and maintain.

Other objects are to achieve the above with a method that is safe, rapid, lightweight, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a top-plan view, schematically representing an irrigation system according to an embodiment of this invention.

FIG. 2 is a schematic representation of a side elevational view of an end vehicle according to a general representation of this invention.

FIG. 5 is a front elevational partial view of the central control section showing the control devices for regulating the end vehicles.

FIG. 6 is a top-plan view, somewhat schematic, showing the central control section of FIG. 5.

DESCRIPTION OF THE PREFERRED EMBODIMENT

Figure 3:
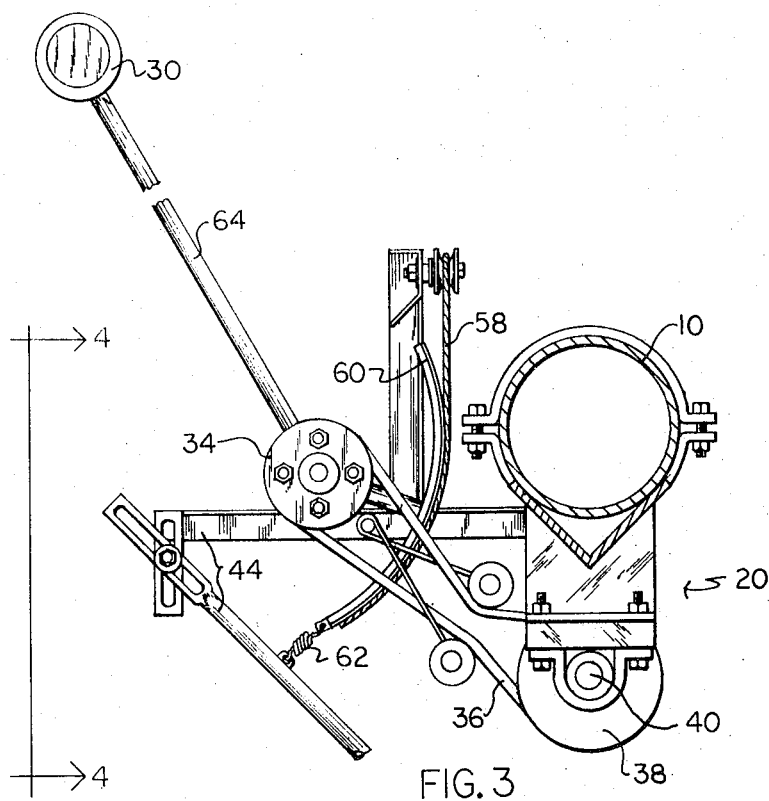
FIG. 3 is a side elevational partial view of a part of one of the end vehicles illustrating a specific embodiment of this invention as would be seen on line 3—3 of FIGS. 1 or 4.

Referring specifically to FIG. 1, it may be seen there illustrated pipe 10 with sprinklers 12 mounted thereon. The pipe is supplied by flexible coupling 14 from line 16 with water under pressure. This is means attached to the pipe 10 for supplying the pipe with water under pressure so that water may be discharged from sprinklers 12 to irrigate the land. The pipe 10 is supported by a plurality of vehicles 18, including end vehicle 20 located away from the line 16 and another end vehicle 22 which is adjacent the line 16. The vehicles 18 support the pipe and provide mobility to the pipe in a direction transverse, generally at right angles, the pipe 10. Drive means on this system includes a motor 24 which is geared to main-system shaft 26 which transmits power to each of the vehicles 18, 20, and 22.

The system as described to this point is well known in the art and commercially available on the market. The shaft 26 together with pipe 10 also form an alignment means in the system for maintaining all of the vehicles 18 in alignment between the end vehicles 20 and 22. See my prior U.S. Pat. No. 3,417,766.

Referring to FIG. 2, this illustrates my invention in general application. A box on the drawing represents regulatory means 28 for regulating the speed of the end vehicle 20. It will be understood that the end vehicle 22 would likewise have means 28 for regulating its speed. In general terms of the invention, regardless how the end vehicle was powered (e.g., rotating shaft, reciprocating cables, pulsating fluid, or hydraulic pressure from the pipe 10) there would be regulatory means for regulating the speed of end vehicles 20 and 22. This regulatory means would be controllable so that the entire system could be steered or guided by regulating the end vehicles. Inasmuch as all the other vehicles will align themselves between the end vehicles, if the end vehicles are guided, the entire system is guided. The system as a whole moves basically in a straight line, sweeping rectilinearly across the land to be watered. I.e., if one end of the pipe 10 were anchored to form a circular-moving system as disclosed in the ZYBACH patent, cited above, steering the entire system is rather meaningless inasmuch as the anchoring of the end of the pipe fixes the path of the system. It is only where the system as a whole is free to wander across the field that guidance or steering is necessary. Likewise it will be understood that the invention, as disclosed here, is not in any way dependent upon the vehicles having wheels 32 as disclosed here. It could be any sort of skid system as shown in, e.g., the BOONE patents noted above.

Also, as a general embodiment, there is an indicator or flag 30 connected to the regulatory means 28, which is pivoted at its connection to the regulatory means. The flag 30, by its position, indicates the speed at which the end vehicle 20 is driven. If the flag is vertical, the indication is that the vehicle is being operated at maximum speed and as the flag is pivoted so that it is lowered, it indicates that the end vehicle 20 is being operated at a reduced speed, something less than its maximum.

Figure 4:
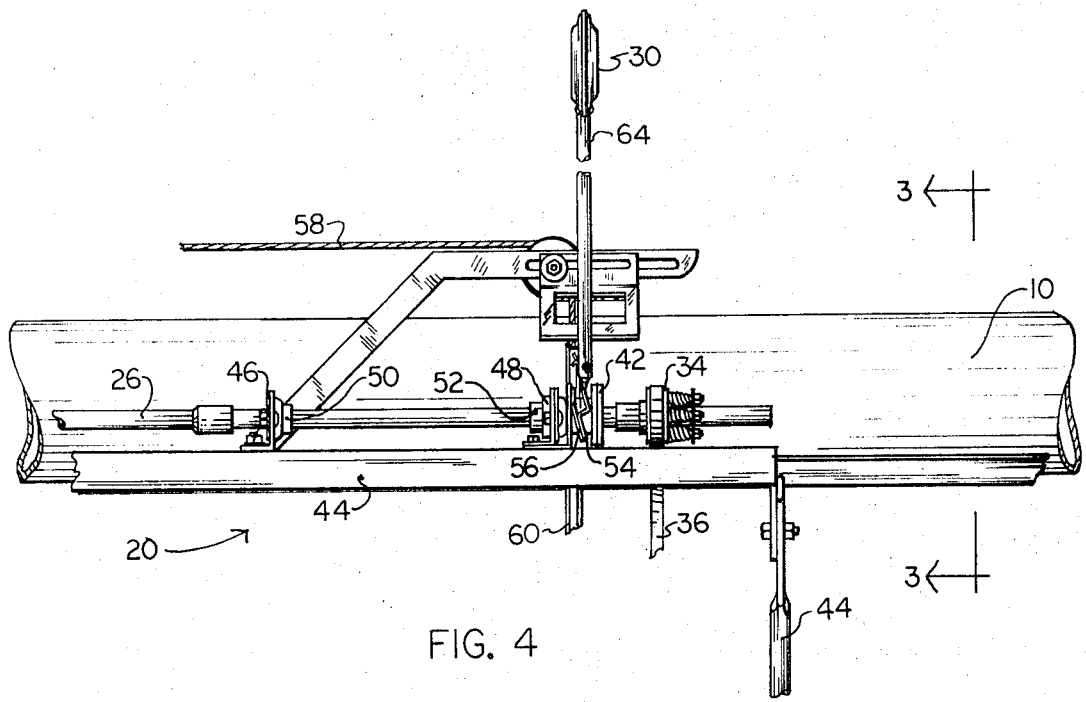
FIG. 4 is a front elevational view of a part of one of the end vehicles according to the specific embodiment of FIG. 3 as would be taken on line 4—4 of FIGS. 1 or 3.

Referring now to FIGS. 3 and 4, the specific mechanism for regulating the speed of the end vehicle is illustrated, specifically applied to a shaft-driven system, which also has a shaft aligning system as disclosed in my prior U.S. Pat. No. 3,417,766 noted above. The power is transmitted to the vehicle 20 through the shaft 26 and there is variable diameter sheave 34 mounted at the vehicle 20. V-belt 36, trained around the variable diameter sheave 34, and jack sheave 38 on jack shaft 40 form a transmission from the drive means to the vehicle 20. The gear ratio of this drive means may be changed by the movement of plate 42. Inasmuch as the specific method of changing the gear ratio of the transmission by the movement of the plate 42 is fully described in my U.S. Pat. No. 3,417,766, specifically illustrated in FIGS. 8 and 9 of that patent and described in the description of the third embodiment beginning on column 4 of that patent, it will not be repeated here. However, it is understood that the movement of the plate 42 axially along shaft 26 will change the gear ratio by changing the effective diameter of the variable diameter sheave 34.

Specifically, on the end vehicle 20, the shaft 26 is supported on frame 44 by bearing blocks 46 and 48. The shaft 26 is fixed so that there is no movement along the vehicle in this area by collars 50 and 52 attached to the shaft 26 adjacent to each of the bearing blocks 46 and 48 as illustrated. Therefore, a fixed helical wedge plate 54 is attached to the bearing block 48 and a rotatable helical wedge plate 56 is placed between the fixed wedge plate 54 and the plate 42. With the wedges of the plates 54 and 56 mating, rotation of the plate 56 will cause movement of the plate 42, thus accomplishing the change of the gear ratio.

The rotatable helical wedge plate 56 is rotated by cable 58 which is attached to sector 60 which is attached to the plate 56. Spring 62 extends from the sector 60 to the frame 44. Therefore, movement of the cable 58, acting through the sector 60, which is attached to the plate 56, rotates it. Thus, the movement of the cable 58 changes the gear ratio of the transmission of power from the shaft 26 to the end vehicle 20 thus changing its driven speed. Flag staff 64, which has flag 30 on the end thereof, is attached to the rotatable plate 56 so that the position of the rotatable wedge plate is indicated, which is an indication of the gear ratio of the end vehicle 20 which is in itself an indication of the speed.

Therefore, it may be seen I have provided on mechanical transmission elements, shifting means on the end vehicle for changing the gear ratio between the mechanical transmission and the vehicle, thereby regulating the speed thereof.

The other end vehicle 22 will have a mirror image of the mechanism described so that likewise, change of cable 68 will change the speed ratio of the end vehicle 22.

As illustrated, the motor 24 to power the system is located about the middle of the system. Located in such position, the stress, and therefore the strain, upon the shaft 26 is reduced; therefore, I find it advantageous to have the controls for the end vehicles at this central section 70 of the elongated pipe 10. However, it will be understood that the term "central section" could indicate any section of the pipe 10 and it indicates only where the steering of the system will be controlled. The central section 70 has two winches 72 and 74 mounted thereon. Cable 58 is wound on winch 72 and cable 68 is wound on winch 74. Therefore, the operator at the central section 70 by cranking the winch 72 or 74 can control the speed of either of the end vehicles 20 or 22.

The operator sometimes has difficulty in keeping his sense of direction when he is in a large field; therefore, certain aids have been provided for him, one of which is magnetic compass 76 which is mounted upon the pipe 10 at the central section with the winches 72 and 74. The operator of the system may use the magnetic compass 76 to help him maintain the system in proper alignment with the boundaries of the field which he can not see. A sighting device 78 such as a tube with cross hairs is mounted on the pipe 10. By clamping the sighting device 78 so that it points to a far distant object (such as a mountain peak) the system may be maintained in constant angular relationship therewith and therefore, in alignment with the boundries of the field where the system is watering. Of course it will be understood that other aids could be used, e.g., a telescope and compass could be incorporated into a single instrument such as is conventional with surveying equipment.

Also, I have found it desirable to provide a seat 80 clamped to the frame of the vehicle carrying the motor 24 so that the operator may be seated as he guides the system along with or without the use of his aids.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In an irrigation system having
   a. an elongated pipe adapted to carry sprinklers thereon,
   b. means attached to the pipe for supplying water under pressure to the pipe,
   c. a plurality of vehicles including a vehicle at each end of the pipe movingly supporting the pipe,
   d. drive means on the system for driving each vehicle transversely to the elongated pipe, and
   e. alignment means on the system for maintaining all the vehicles in alignment between the end vehicles;
   f. the improvement in combination with the above comprising:
   g. sighting means mounted on the pipe for guiding the system with relationship to a distant object.

2. The invention as defined in claim 1 with an additional limitation of
   h. regulatory means mounted on each of the end vehicles for regulating the driven speed thereof.

3. The invention as defined in claim 1 with an additional limitation of
   h. a compass mounted on the pipe.

4. In an irrigation system having
   a. an elongated pipe adapted to carry sprinklers thereon,
   b. said elongated pipe terminating with a far end and a near end,
   c. means attached to the pipe for supplying water under pressure to the pipe, d. an end vehicle at the far end of the pipe,
e. another end vehicle at the near end of the pipe,
f. a plurality of intermediate vehicles between said end vehicles,
g. said vehicles movingly supporting the pipe,
h. drive means on the system for driving each vehicle transversely to the elongated pipe, and
j. mechanical structure connecting the pipe and all the intermediate vehicles, said structure forming a portion of
k. alignment means on the system for maintaining all of the intermediate vehicles in alignment between the end vehicles;
m. the structural improvement for steering the system which comprises in combination with the above
n. regulatory means mounted on each of the end vehicles for regulating the driven speed thereof,
o. said regulatory means different from said alignment means,
p. a control section on the elongated pipe,
q. control means extending from each end vehicle to said control section for controlling said regulatory means,
r. said drive means including a mechanical transmission element extending from one end vehicle to the other end vehicle,
s. shifting means on each of the end vehicles for changing the gear ratio between the mechanical transmission element and the vehicle, thereby regulating the speed thereof,
t. said control means including a cable stretched from the control section to the shifting means on each end vehicle, and
u. the shifting means responsive to the movement of the cable.

5. The invention as defined in claim 4 with additional limitations of
v. an indicator upon the shifting means on each end vehicle,
w. said indicator indicating the driven speed of the regulatory means thereon.

6. In an irrigation system having
a. an elongated pipe adapted to carry sprinklers thereon,
b. said elongated pipe terminating with a far end and a near end,
c. means attached to the pipe for supplying water under pressure to the pipe,
d. an end vehicle at the far end of the pipe,
e. another end vehicle at the near end of the pipe,
f. a plurality of intermediate vehicles between said end vehicles,
g. said vehicles movingly supporting the pipe,
h. drive means on the system for driving each vehicle transversely to the elongated pipe, and
j. alignment means on the system for maintaining all of the intermediate vehicles in alignment between the end vehicles,
k. said alignment means including mechanical structure connected to all the intermediate vehicles;
m. the structural improvement for steering the system which comprises in combination with the above;
n. regulatory means mounted on each of the end vehicles for regulating the driven speed thereof,
o. said regulatory means different from said alignment means,
p. a control section on the elongated pipe,
q. control means extending from each end vehicle to said control section for controlling said regulatory means,
r. said drive means including a mechanical transmission element extending from one end vehicle to the other end vehicle, and
s. shifting means on each of the end vehicles for changing the gear ratio between the mechanical transmission element and the vehicle, thereby regulating the speed thereof.

7. The invention as defined in claim 6 with additional limitations of
r. an indicator upon each end vehicle,
s. said indicator indicating the driven speed of the regulatory means thereon.

8. In an irrigation system having
a. an elongated pipe adapted to carry sprinklers thereon,
b. said elongated pipe terminating with a far end and a near end,
c. means attached to the pipe for supplying water under pressure to the pipe,
d. an end vehicle at the far end of the pipe,
e. another end vehicle at the near end of the pipe,
f. a plurality of intermediate vehicles between said end vehicles,
g. said vehicles movingly supporting the pipe,
h. drive means on the system for driving each vehicle transversely to the elongated pipe, said drive means includes
i. a mechanical element extending from one end vehicle to the other end vehicle, and
j. alignment means on the system for maintaining all of the intermediate vehicles in alignment between the end vehicles,
k. said alignment means including mechanical structure connected to all the intermediate vehicles;
m. the improved method for steering the system which comprises in combination with the above;
n. regulating the driven speed of each of the end vehicles by means different from the alignment means, and
o. varying the speed of the end vehicles by changing gear ratio between the mechanical element and the end vehicle.

9. The invention as defined in claim 8 with an additional limitation of
o. indicating at what regulated speed each end vehicle is driven.

* * * * *